United States Patent
Lee et al.

(10) Patent No.: US 6,842,538 B2
(45) Date of Patent: Jan. 11, 2005

(54) AUTOMATIC DETECTION OF ALIGNMENT OR REGISTRATION MARKS

(76) Inventors: Shih-Jong J. Lee, 15418 SE. 53rd Pl., Bellevue, WA (US) 98006; Seho Oh, 5229 107th St. SW., Mukilteo, WA (US) 98275; Larry A. Nelson, 2401 N. Northlake Way, Seattle, WA (US) 98103

( * ) Notice: Subject to any disclaimer, the term of this patent is extended or adjusted under 35 U.S.C. 154(b) by 663 days.

(21) Appl. No.: 09/815,816

(22) Filed: Mar. 23, 2001

(65) Prior Publication Data

US 2002/0164077 A1 Nov. 7, 2002

(51) Int. Cl.[7] .............................. G06K 9/00; G06K 9/62; G06K 9/36; H04N 1/00
(52) U.S. Cl. ........................ 382/224; 382/145; 382/291; 358/406
(58) Field of Search ................................. 382/151, 291, 382/288, 224, 145, 149; 358/406; 235/462.01

(56) References Cited

U.S. PATENT DOCUMENTS

| | | | | |
|---|---|---|---|---|
| 4,707,647 A | * | 11/1987 | Coldren et al. | ............. 382/151 |
| 4,886,974 A | * | 12/1989 | Ina | ......................... 250/559.36 |
| 5,341,228 A | * | 8/1994 | Parker et al. | ................ 358/534 |
| 5,398,292 A | * | 3/1995 | Aoyama | ...................... 382/199 |
| 5,400,135 A | * | 3/1995 | Maeda | ..................... 356/239.1 |
| 5,446,542 A | * | 8/1995 | Muraoka | ..................... 356/400 |
| 5,469,263 A | * | 11/1995 | Waldo et al. | ................ 356/401 |
| 5,982,927 A | * | 11/1999 | Koljonen | ..................... 382/168 |
| 6,141,464 A | * | 10/2000 | Handley | ..................... 382/287 |
| 6,606,145 B2 | * | 8/2003 | Irie et al. | ....................... 355/72 |
| 6,628,406 B1 | * | 9/2003 | Kreuzer | ..................... 356/508 |

* cited by examiner

*Primary Examiner*—Daniel Miriam
*Assistant Examiner*—Shefali Patel

(57) ABSTRACT

Mark detection and position determination are improved by use of directional elongated filters, symmetry, gray scale image processing, structural constraints, and learning. Directional elongated filters are used to pre-process images of registration marks to create masks and enhanced images. Working sequentially, portions of the mark are detected and classified. The input gray scale image of the mark is processed using its structural constraints in conjunction with a mask for the detected mark. A cost function estimation determines mark position and orientation with sub-pixel accuracy. Learning is used to improve specific application performance.

3 Claims, 12 Drawing Sheets

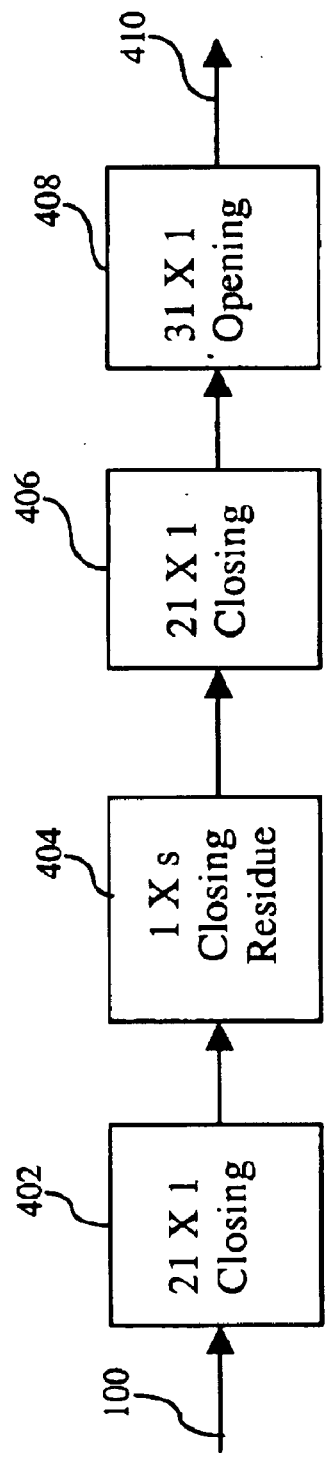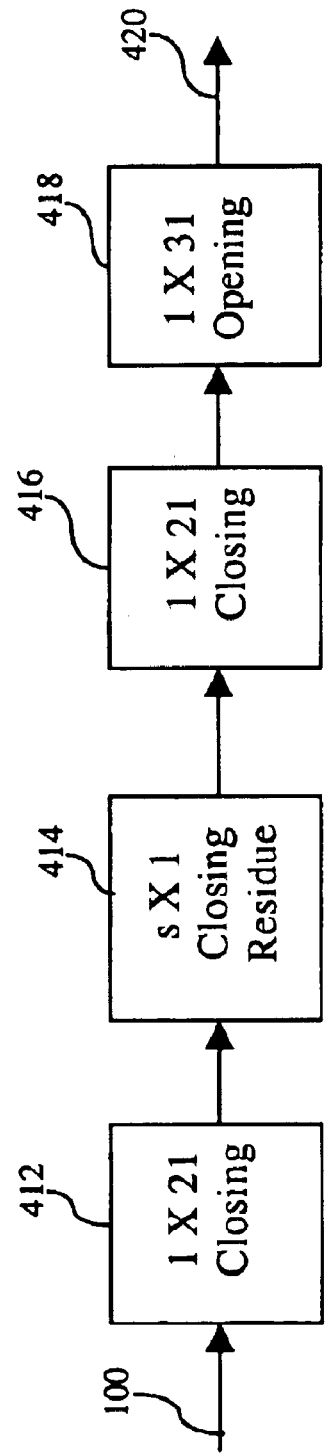
Figure 12A
Figure 12B

AUTOMATIC DETECTION OF ALIGNMENT OR REGISTRATION MARKS

U.S. PATENT REFERENCES

1. U.S. Pat. No. 5,315,700 entitled "Method and Apparatus for Rapidly Processing Data Sequences", by Johnston et. al. May 24, 1994
2. U.S. Pat. No. 6,130,967 entitled "Method and Apparatus for a Reduced Instruction Set Architecture for Multidimensional Image Processing", by Shih-Jong J. Lee, et. al., Oct. 10, 2000
3. Pending application Ser. No. 08/888,116 entitled, "Method and Apparatus for Semiconductor Wafer and LCD Inspection Using Multidimensional Image Decomposition and Synthesis", by Shih-Jong J. Lee, et. al., filed Jul. 3, 1997
4. U.S. Pat. No. 6,122,397 entitled "Method and Apparatus for Maskless Semiconductor and Liquid Crystal Display Inspection", by Shih-Jong J. Lee, et. al., Sep. 19, 2000
5. U.S. Pat. No. 6,148,099 entitled, "Method and Apparatus for Incremental Concurrent Learning in Automatic Semiconductor Wafer and Liquid Crystal Display Defect Classification", by Shih-Jong J. Lee et. al., Nov. 14, 2000
6. U.S. Pat. No. 6,141,464 entitled, "Robust Method for Finding Registration Marker Positions", by Handley; John C, issued Oct. 31, 2000.

CO-PENDING U.S. PATENT APPLICATIONS

1. U.S. patent application Ser. No. 09/693,723, "Image Processing System with Enhanced Processing and Memory Management", by Shih-Jong J. Lee et. al., filed Oct. 20, 2000
2. U.S. patent application Ser. No. 09/693,378, "Image Processing Apparatus Using a Cascade of Poly-Point Operations", by Shih-Jong J. Lee, filed Oct. 20, 2000
3. U.S. patent application Ser. No. 09/692,948, "High Speed Image Processing Apparatus Using a Cascade of Elongated Filters Programmed in a Computer", by Shih-Jong J. Lee et. al., filed Oct. 20, 2000
4. U.S. patent application Ser. No. 09/703,018, "Automatic Referencing for Computer Vision Applications", by Shih-Jong J. Lee et. al., filed Oct. 31, 2000
5. U.S. patent application Ser. No. 09/702,629, "Run-Length Based Image Processing Programmed in a Computer", by Shih-Jong J. Lee, filed Oct. 31, 2000
6. U.S. patent application Ser. No. 09/738,846 entitled, "Structure-guided Image Processing and Image Feature Enhancement" by Shih-Jong J. Lee, filed Dec. 15, 2000.
7. U.S. patent application Ser. No. 09/739,084 entitled, "Structure Guided Image Measurement Method", by Shih-Jong J. Lee et. al., filed Dec. 14, 2000.

REFERENCES

1. Serra, Fernando J., "Advanced Search Techniques for Alignment and Registration", Intelligent Vision '99, Jun. 28–29, 1999

TECHNICAL FIELD

The invention is related to image processing and pattern recognition and, more particularly, to detecting and classifying alignment or registration mark type and measuring the position and orientation of a mark.

BACKGROUND OF THE INVENTION

In the semiconductor wafer production process and multilayer electronic circuit board construction, numerous individual processes are performed sequentially to construct layers of a three dimensional electronic circuit. The general process depends critically on the alignment of each of the individual processes. To characterize alignment between layers, image primitives called alignment or registration marks are imprinted during each process step. By measuring the relative positions of these registration marks, the registration of layers can be determined. Layers can be misregistered in x and y position and the two layers can be rotated with respect to each other. The amount of misregistration that is allowable depends upon the application and the critical dimensions of the electronic circuit that is being constructed. Mis-registration detection is important because of its effects on yield and performance of the finished circuit.

Detection of alignment or registration marks and their accurate characterization may be done manually or automatically. Both processes suffer from corruption of the marks by noise and processing artifacts that cause interference with the basic imprinted marks. Interference creates gray scale patterns that perturb the simple patterns and the background, making it more difficult to measure basic registration information.

PRIOR ART

An image segmentation approach is used in the prior art for image feature detection or object measurement. The image segmentation approach converts a grayscale image into a binary image that contains object of interest masks. Binary thresholding is a common technique in the image segmentation approach (U.S. Pat. No. 6,141,464 entitled, "Robust Method for Finding Registration Marker Positions", by Handley; John C, issued Oct. 31, 2000 column 4 lines 58–59).

Image features such as edges in an image are smeared over a distance of four or five pixels, an effect that is the result of a reasonably sufficient sampling basis, imperfections in the camera optics, and the inevitability of physical laws (finite point spread function). Because edges or features of an image are imaged by the optical and imaging system as continuously varying gray levels, there exists no single gray level that represents edge pixels. For this reason, any system that depends on segmentation or a binary thresholding of the image before critical dimensions are determined must necessarily introduce quantization errors into the measurement. Binary thresholding also exacerbates the resolution limiting effect of system noise. Pixels whose gray levels are close to the threshold level are maximally affected by small variations due to additive noise. They may either be included or excluded into the mask based on the noise contribution to their instantaneous value.

In the prior art methods, an image of the registration mark is sometimes conditioned by linear filtering to reduce artifacts that degrade or prevent accurate measurement. Unfortunately, linear filtering methods are sensitive to the noise surrounding the mark, influencing the position and quality of the edges that are used to determine position. These difficulties are caused by group envelope delay distortion, transient aberration, overshoot, ringing, pre-shoot, phase shift and stored energy within the filter itself caused by extraneous noise surrounding the edge which is the source of measurement information. Additionally, most prior art filters are one dimensional, and cannot take useful advantage of the marks physical size, known mark structure, mark direction, structural constraints, or basic characteristics that are multidimensional.

Normalized grayscale correlation is used to locate patterns in precise alignment and registration applications. However, the correlation methods are significantly limited when the appearance of objects are subject to change due to normal process variations. Another method of measurement is to filter the image of the registration marks with a linear filter and then to do a gray scale projection of a portion of the mark to produce a one-dimensional portrayal of the transient characteristic of a mark edge that is noise reduced. In the presence of mark rotation from the expected axis, gray scale projection markedly reduces the detected edge amplitude and spreads it over a distance, making thresholding to detect position a very noise sensitive operation. The effects of linear filtering (ringing and transient aberration) cause additional difficulty because these transient errors make thresholding ineffective in determining edge position. Thresholding enshrines the errors that preceded it, forever destroying the ability to make accurate measurements of position and orientation. Using the prior art process, results can be inaccurate when the image of the registration mark is not ideal.

In the prior art, (Serra, Fernando J., "Advanced Search Techniques for Alignment and Registration", Intelligent Vision '99, Jun. 28–29, 1999) recognition of mark characteristics is generally not highly constrained, leading to artifacts and false alarms. Example simple constraints in the prior art include simple edge detection and element length for position location of elements of the composite mark whereas the mark element orientation with respect to other mark elements, edge location all along the length of the mark element, mark size, mark linewidth, etc. could have been used to filter and locate the true mark position. The additional constraints can operate to increase robustness and accuracy for type detection as well as location measurement. Further, they are applied without thresholding where accurate and robust measurements are required.

OBJECTS AND ADVANTAGES

It is an object of the invention to use a-priori knowledge of registration mark structure in constructing and applying the pre-processing and artifact rejection filter process.

It is an object of the invention to use knowledge of registration mark structure to measure mark position.

It is an object of the invention to generalize the use of a constrained set of marks to actual applications by learning application influences on size, geometry, symmetry, replication, centering and other learnable variations.

It is an object of the invention to use constraints of the registration marking to estimate each registration mark position and to reduce the effects of noise or image rotation.

It is an object of the invention to detect the location, orientation and type of each registration mark by developing distinguishing feature values sequentially.

It is an object of the invention to detect the center of each registration mark based on symmetry of the mark.

It is an object of the invention to use directional elongated filters to preprocess images of registration marks to remove or reduce the effects of noise and imaging artifacts.

It is an object of the invention to further reject artifacts based on symmetry imperfection.

It is an object of the invention to sequentially detect portions of a mark by working systematically outward from the center of the mark.

It is an object of the invention to mask detected portions of the mark while sequentially detecting additional portions of the mark.

It is an object of the invention to classify detected marks to distinguish the actual marks from a set of possible marks.

SUMMARY OF THE INVENTION

This invention provides a robust method to find the mark location and determine the type of the mark. Directional elongated filters pre-process the mark image to reject noise and non-mark artifacts and to enhance mark features. Symmetry of the mark is used to further reject non-mark artifacts. The center of the mark is identified based on mark symmetry. Working outward from the center of the mark, sub-portions of the mark are detected and classified in a sequential process. The masks that identify mark location are also used in a later process to direct processing for measuring mark location and orientation.

This invention also provides a robust method to estimate the fine location and angular alignment of marks using the original gray scale image. The mark type classification gives knowledge of appropriate structure. The position, scale, and orientation of the structure associated with the particular mark is the structure used in the structure-guided estimation method. The structure-guided estimation method performs estimation within the regions defined by each component of the measurement mask(s). The structure location is compared to the real data in the image to determine a best fit estimation of mark location and orientation. Estimation finds the parameters that minimize a cost function by a weighted minimum-square-error (MSE) method. This measurement method uses all the pixels associated with the detected portions of the mark to create a measurement having sub-pixel accuracy. Interference with the mark detection and location is minimized by the image pre-processing in the detection process to generate mask and weight information. The masks and a weight image created during the detection process focus the measurement cost function on locations in the image that are most important and exclude regions that are not related to the measurement. Measurement is not influenced by imperfect initial image orientation.

A learning process is used to incorporate process specific experience into the knowledge of mark structure characteristics and thereby improve noise rejection and image enhancement. Learning improvement enhances the utility of the invention. Learning provides the necessary experience.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

FIG. 12A shows the processing flow for a noise removal process for horizontal elements of the mark shown in FIG. 8.

FIG. 12B shows the processing flow for a noise removal process for vertical elements of the mark shown in FIG. 8.

DETAILED DESCRIPTION OF THE INVENTION

1. Concept

Figure 1:
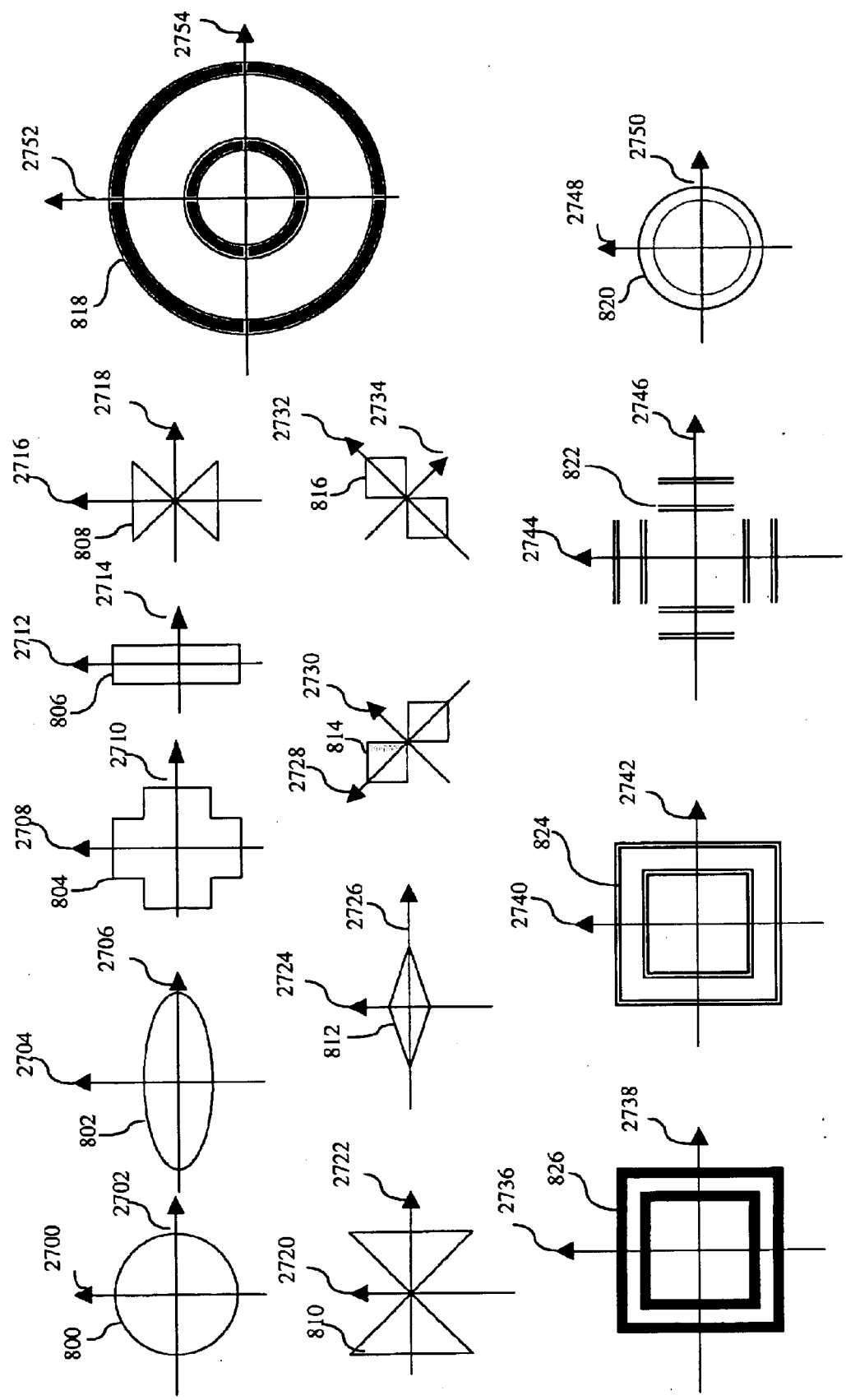
FIG. 1 shows example registration marks and their axes of symmetry.

Electronic assembly requires automatic alignment of printed circuit board layers before processing steps can be applied. Similarly, a semiconductor manufacturing process requires precise pattern registration among processing layers because the minimum feature size of the pattern is tiny and is getting even smaller. Any registration mismatch between layers has to be detected and corrected. Pre-defined fiducial marks are provided in printed circuit boards for alignment. To detect a semiconductor manufacturing process registration mismatch, registration marks are projected onto each processing layer, and the relative positions of the registration marks between consecutive layers are measured. The alignment or registration check is performed by capturing an image of the printed circuit board or a region of a wafer and searching for pre-defined marks. Once the marks are found, their contours can be extracted and position, scale and orientation of each mark can be determined. FIG. 1 shows typical alignment marks for electronic assembly that includes circle 800, ring 820, cross 804, bar 806, triangles 808, 810, diamond 812, or multiple squares 814, 816. Typical registration marks for semiconductor manufacturing processes include rectangular marks such as a box within a box 826, a circle within a circle 820, a ring within a ring 818, or a collection of bars 822 and frames 824. Mark detection and location is a relatively simple task if the marks are well defined and the images have high contrast and low noise. Mark detection can be accomplished by a correlation method. However, in most practical applications, the fiducial marks or registration marks are degraded with low contrast and significant background noise due to the processes they support and normal or occasionally faulty process variations. Furthermore, the types of the marks may not be known. This may require not only detection but also classification of the mark types prior to automatic alignment. This invention provides a robust method to detect difficult-to-locate fiducial marks and classify their types. In one embodiment of the invention, semiconductor wafer processing registration marks are located and their types classified by a structure-guided method (reference U.S. patent application Ser. No. 09/738,846 entitled, "Structure-guided Image Processing and Image Feature Enhancement" by Shih-Jong J. Lee, filed Dec. 15, 2000 and U.S. patent application Ser. No. 09/739,084 entitled, "Structure Guided Image Measurement Method", by Shih-Jong J. Lee et. al., filed Dec. 14, 2000 incorporated herein in their entirety).

2. Overall Architecture

Figure 2:
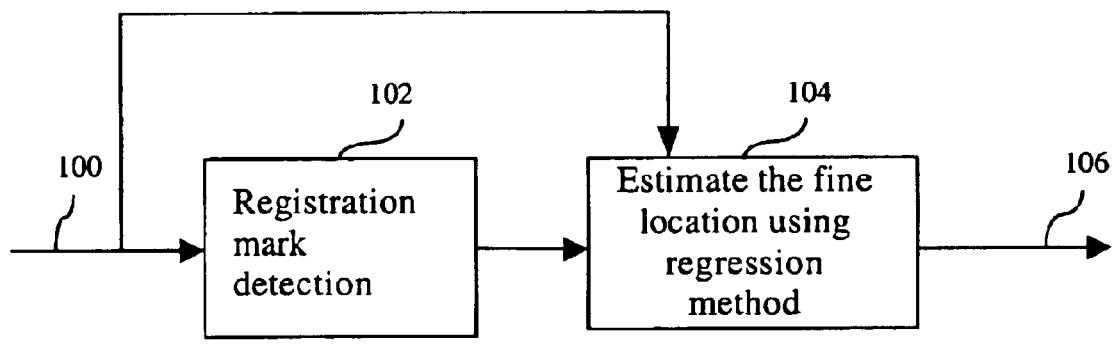
FIG. 2 shows the block diagram of the overall architecture for detecting and measuring registration marks.

FIG. 2 shows the processing flow for the initial and refined estimation of the location of the marks and the determination of the mark type. An input image is received 100. The system detects and coarsely locates the mark 102. The output of the block 102 is a binary image showing the detected mark areas and the mark type. Using the output of the block 102 and the weighted image which is generated by block 104, the finer location of the mark is estimated. The method to get finer mark location is the structure-guided estimation that is a weighted regression method integrating the structures into constraints of estimation. The constraints include geometrical structures such as line, circle, ellipse, and rectangle, and spatial relationships such as parallel, orthogonal, intersection with known angles, or constant distance between lines. The output 106 contains the structure-guided estimation result of the mark that includes the shape structure and the accurate parameters of the structure representation.

2.1 Detection Algorithm

Registration marking systems frequently use more than one mark for alignment of multiple processes or layers or they use a complex mark comprised of portions applied on separate layers. In the preferred embodiment, registration marks are detected one at a time (or one significant portion at a time), generally using a point of symmetry for determination of a working center then working from the center outward (or other systematic method) to detect marks or portions of marks sequentially. In this embodiment, the original image is processed and, working away from the center, the first mark (or portion of a mark) is detected. The detected portion is masked out of the image. Then begins the detection of mark elements sequentially. The idea in this embodiment is to align marks arising from different processes, or to measure their misalignment. To do this, more than one mark has to be present or the single mark is composed of components that are separately imprinted but form a composite mark. Starting closest to the center and working outward, the first portion of the mark is detected. After completing detection of the first portion of the mark, the first mark portion is excluded from the next sequential mark detection and the process is begun again. This process is repeated until all marks are detected. Finally, the mark type classification is done for each detected mark.

2.1.1. Find the Center and the Symmetry Axes

Figure 4:
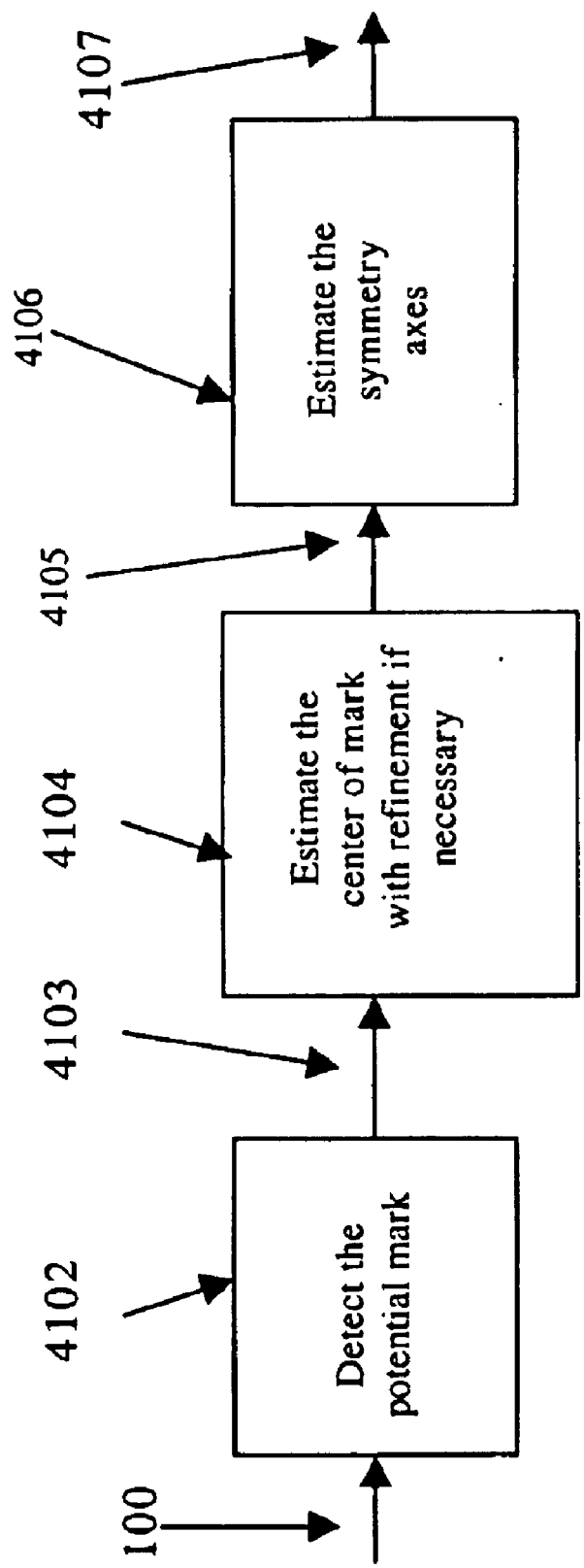
FIG. 4 shows the procedure to find the center of the mark and the axes of symmetry.

The method to find the center and the symmetry axes of the registration mark is important for locating and identifying marks of interest. The procedure is illustrated in FIG. 4. The first step is a detection module 4102 that detects potential mark features including the true mark and false marks. The output 4103 of module 4102 is the potential mark. The potential mark features are refined using the relation of symmetry and other structure constraints such as equal length, equal shape, line width, or known angles between structures. The center of the mark can be estimated from the centroid or median values of the potential mark. If the measured asymmetry around the estimated center of the mark is not acceptable, then the refinement procedure uses tighter constraint of the relation of symmetry and estimation of the center of the mark is repeated until the measure of asymmetry is acceptable. In a preferred embodiment of the invention, the measure of asymmetry is calculated as $$\text{Measure of asymmetry} = \Sigma(I[x][y] - I[2^*Xc-x][2^*Yc-y])^2 / \Sigma(I[x][y])^2$$

where Xc and Yc are the x and y coordinates of the estimated center of mark, and I[x][y] is the image value at x and y coordinates. The measure is conducted for all points within the potential mark feature images. The measure of asymmetry is zero if the mark features are symmetric around the center of the mark. The potential marks are not symmetric around the center of the mark if the measure of asymmetry value is high.

As shown in FIG. 4, this procedure is performed in module 4104, the output 4105 is the coordinate for the center of the mark. After the center of the mark is estimated, symmetric axes are estimated. Let the symmetric axis be $$a(x-Xc)+b(y-Yc)=0$$

where $a^2+b^2=1$
and $b>0$.

To find symmetric axis, minimize the following cost function for different values of a and b.

That is: MIN Cost and
a,b $$Cost=\Sigma(I[x][y]-I[xr][yr])^2/\Sigma(I[x][y])^2$$

where xr and yr is the x and y coordinates of the symmetric point of (x,y) and the relationship is $$xr=Xc-[2*a*b*(y-Yc)+(a^2-b^2)*(x-Xc)]$$

$$yr=Yc-[2*a*b*(x-Xc)-(a^2-b^2)*(y-Yc)]$$

In FIG. 4, this operation is done in block 4106, and the output 4107 is the axes of the symmetry.

2.1.2. Sequential Detection of Mark Components

Figure 3:
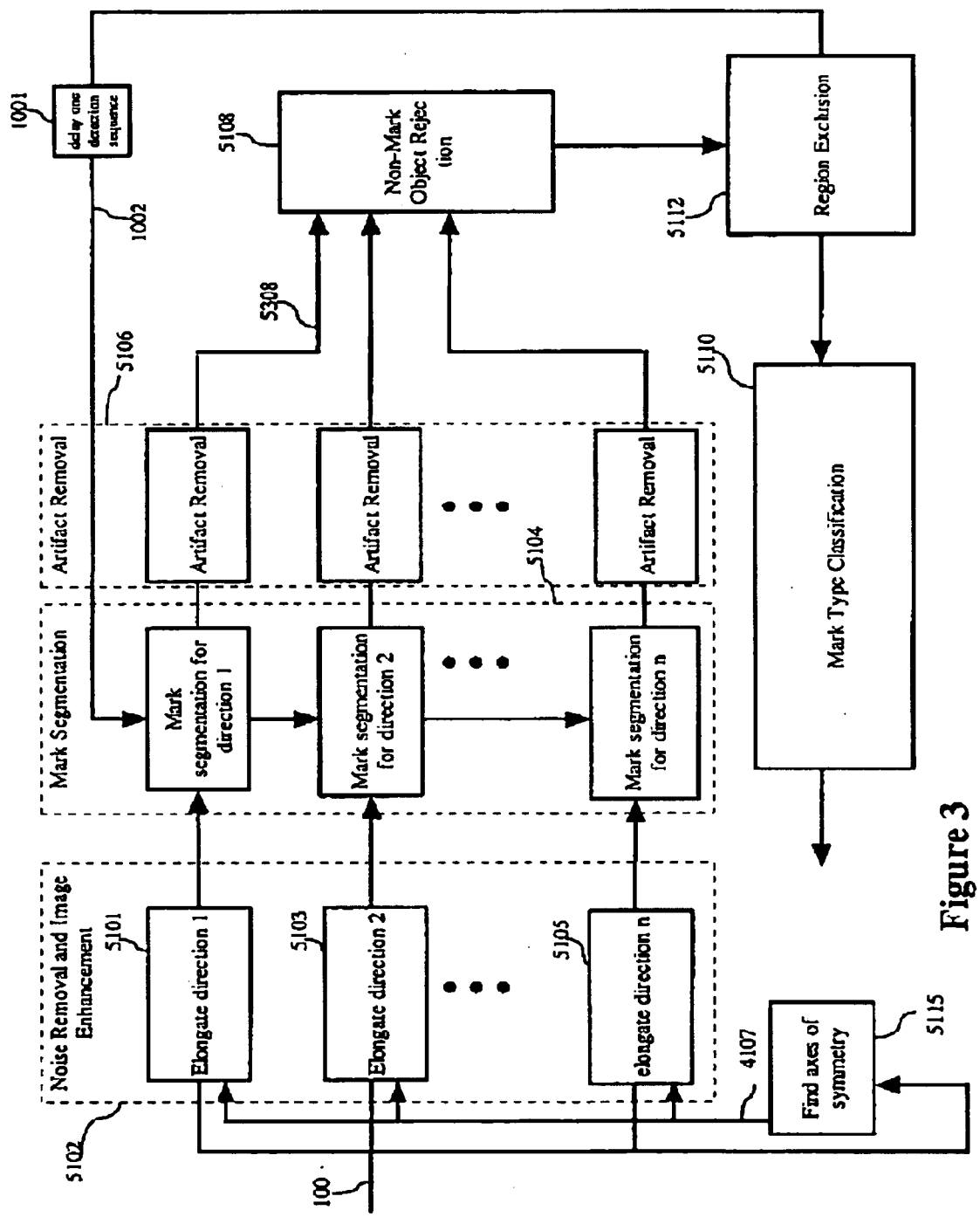
FIG. 3 shows the processing flow for the sequential detection of registration marks.

The processing flow for detection of a mark is shown in FIG. 3. The mark image contains multiple components of different directional orientation. An elongated directional decomposition is required. After the decomposition, the operations for filtering, detection and artifact rejection are done for the elongate direction associated with that portion of the decomposition. The elongate directions are determined from the information about the mark types that are included in the set of mark possibilities. The processing steps include noise removal and image enhancement 5102, mark segmentation 5104, artifact removal 5106, non-mark object rejection 5108, region exclusion 5112, and mark type classification 5110. The processing parameters such as the direction and size of directional elongated morphological operations are derived from the structure information of the possible marks by determining the basic shapes that make up the mark, the basic size limitations, expected orientation, color, relative orientation to other elements in the mark, width of the basic shapes that constitute the marks, and other distinguishing characteristics. In the example shown in FIG. 3, the processing and detection of directionally unique portions of the mark are separately done in parallel, however they can be done serially (e.g. clockwise in addition to from the center out).

The noise removal and image enhancement stage 5102 enhances the image to reduce the effect of noise and enhances features for the detection stage by filtering as described in co-pending U.S. patent application Ser. No. 09/738,846 entitled, "Structure-guided Image Processing and Image Feature Enhancement" by Shih-Jong J. Lee, filed Dec. 15, 2000 applied to a gray scale image. The mark segmentation stage 5104 thresholds the enhanced image to extract mark areas. The enhanced image may contain noisy or erroneous features, that result in binary artifacts. The artifact removal step removes binary artifacts of the detected mark 5106 by further filtering operations utilizing binary morphological structuring elements and nonlinear morphological operations. The results from each direction of mark processing are collected together. If artifacts remain, they are rejected based upon their symmetry properties. This procedure is done by a rejection stage 5108.

2.1.2.1. Noise Removal and Image Enhancement Step

Figure 5:
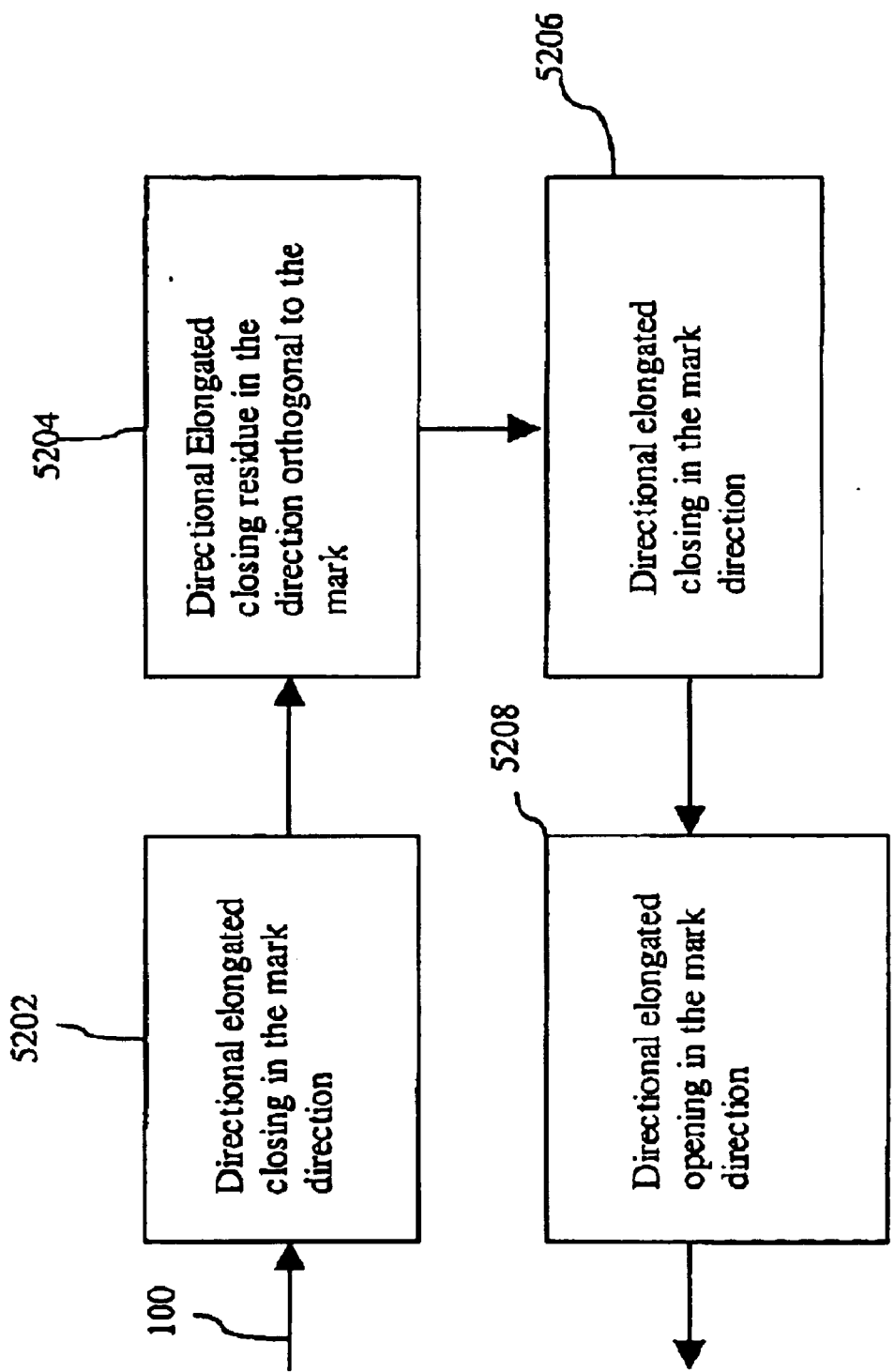
FIG. 5 shows the processing flow for the noise removal procedure.

The noise removal step removes the noise in the image. The noise can be additive noise, spikes, or patterned noise of irrelevant patterns. The noise removal process is accomplished by linear low pass filtering, median filtering, or morphological filtering. In a preferred embodiment of the invention, directional elongated morphological filters are used for noise removal. From the structure of the possible marks, the direction and size of the directional elongated morphological filters can be derived. By chosing the proper structuring element for the feature extraction processing sequence, structure-guided feature extraction can be efficiently accomplished. In a preferred embodiment of this invention, features of different structures are extracted using directional elongated structuring elements. Directional elongated structuring elements have limited width in one of its dimensions. It can be efficiently implemented in a general-purpose computer using the methods taught in co-pending U.S. Patent Applications entitled "U.S. patent application Ser. No. 09/693,723, "Image Processing System with Enhanced Processing and Memory Management", by Shih-Jong J. Lee et. al., filed Oct. 20, 2000 and U.S. patent application Ser. No. 09/692,948, "High Speed Image Processing Apparatus Using a Cascade of Elongated Filters Programmed in a Computer", by Shih-Jong J. Lee et. al., filed Oct. 20, 2000. The direction of the elongated structuring element is chosen to be approximately orthogonal to the primary direction of the features to be extracted. The process works even if the input edge is slightly rotated. Also, directional elongated filters can be applied on any orientation according to the needs to preprocess for particular mark characteristics. In FIG. 5 it is assumed that the mark image has dark elements. If this is not the case, the image can be inverted before pre-processing. The processes of FIG. 5 can be applied in any direction and can be reapplied in multiple directions to filter for all expected elements of the mark. In an application, the first directional elongated closing operation 5202 reduces the noise in the mark image by eliminating small dark extraneous image noise. The directional elongated closing residue operation 5204 enhances the mark and brightens the retained elements. The next directional elongated closing operation 5206 fills in the bright image elements. The last directional elongated opening 5208 reduces the noise in the background. The output image of the mark 5210 has bright image detail and only contains portions of the mark that are aligned with the structuring elements in 5202, 5206, 5208. The original image is processed by this method for each principle axis having elements important to the overall mark characteristics.

2.1.2.2. Mark Segmentation

Figure 6:
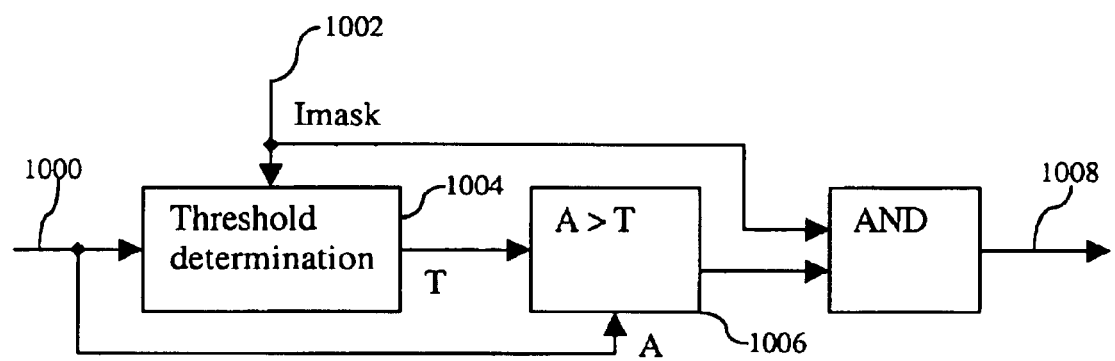
FIG. 6 shows the processing flow for the thresholding step.

The segmentation step is done by thresholding the output image of the noise removal module 1000 (FIG. 6). The thresholding method can be a simple global thresholding or local thresholding based on the neighboring pixel values. The method used in the preferred embodiment is the global thresholding method 1004 as shown in FIG. 6. In FIG. 6, the threshold value is $$Threshold=\alpha*maximum\ pixel\ value+(1-\alpha)*median\ pixel\ value$$

α can be any value between 0 and 1 and the maximum and median pixel values are for image pixels 1000 within the operating area of the mask image. The threshold value T is compared to the image value A in step 1006. The mask input 1002 is the mechanism for region exclusion and indicates the mask output from the previous detection sequence. The delay element 1001 (FIG. 3) provides the mask for the previous detection sequence. 0=blocked, 1=operating. The input 1000 is the output of the noise removal block 5102 which is a particular directional portion of the mark that is indicated as bright. The output 1008 is a segmentation of the remaining portions of the mark (working sequentially for detection) having the filtered direction.

2.1.2.3 Artifact Removal

Figure 7:
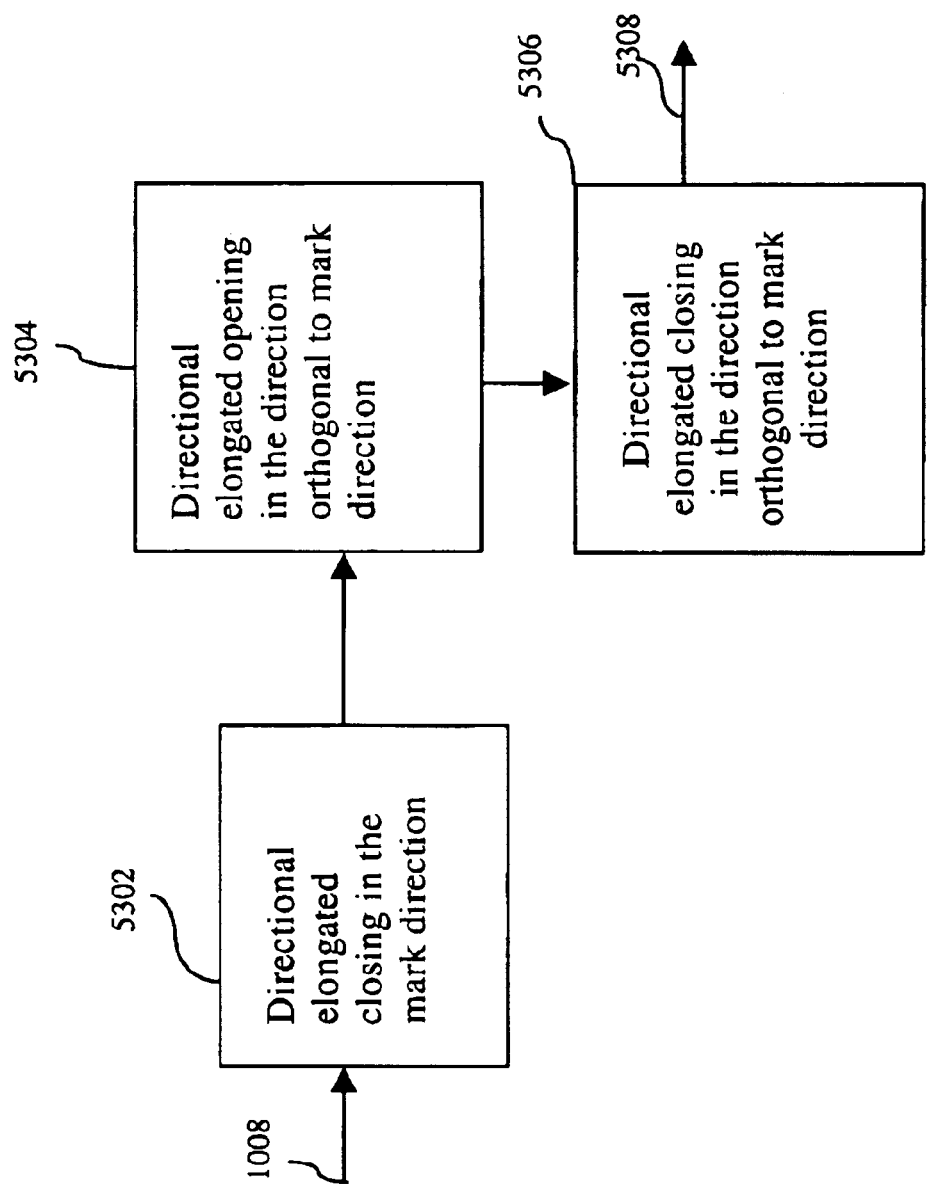
FIG. 7 shows the processing flow for the artifact removal procedure.

The artifact removal process 5106 removes thin artifacts caused by noise in the image and/or the detection stage. This output of the detection stage is a binary image with mark elements shown as bright areas. The structuring element is selected to restore the binary image of the portion of the mark that was detected. A general embodiment of the procedure is shown in FIG. 7. In FIG. 7, the first directional elongated closing operation 5302 restores breaks in the portions of the mark in the mask area that are directionally aligned with the closing operation. The directional elongated opening operation 5304 is oriented orthogonal to the initial closing operation and the processing element is short enough to preserve mark elements. This closing operation eliminates artifacts that are thinner than the mark, but aligned in a similar direction as the mark. The directional elongated closing operation 5306 closes the double line contained in the particular mark shown in FIG. 8 to produce a simpler pattern for measurement.

2.1.2.4 Non-Mark Object Rejection

The non-mark object rejection process 5108 (FIG. 3) removes objects that are not qualified as part of the potential mark but are too thick to have been rejected in the artifact removal process 5106. In the preferred embodiment of the invention, the qualification for an object in a potential mark depends on its symmetry characteristics. For example, the length of the lines located in opposite positions from the center of symmetry should be the same. Since the marks are symmetric along the axis of symmetry, the flipped version of one object along the axis of symmetry should match a counter part object in the received image 5308. If an object has no matched counterpart in the image 5308, the object is an artifact. In this embodiment, for example, if the symmetric axis is $$ax+by+c=0,$$

and the particular object in the output of the artifact removal stage is A. A can be described by its set of pixels, and the counter object is B also described by its set of pixels. Then B is:

B={(xr,yr)|(x,y)∈A} and the relationship between (xr,yr) and (x,y) is $$xr=-2*a*b*y-(a^2-b^2)*x-2*a*c$$

$$yr=-2*a*b*x+(a^2-b^2)*y-2*a*c$$

In one embodiment of the invention a metric to estimate matching is:

matching score=area(A∩B)/area(A).

where ∩ indicates the intersection of the two object sets
A larger matching score indicates better matching.

2.1.2.5 Mask Image Region Exclusion

This process 5112 excludes (blocks out) the region(s) of mark(s) that are detected in the current sequence. To simplify the detection process, the portion of the mark detected by the current sequence does not have to be re-detected in the next sequence. This is accomplished in the preferred embodiment of the invention by setting the detected image mask 1002 (FIG. 6) values to zero. This excludes the portion of the marks that have already been detected in the current sequence, creating an updated image for detection. The updated image is then used for the detection of remaining marks in the next sequence.

2.1.2.6 Mark Type Classification

Figure 9:
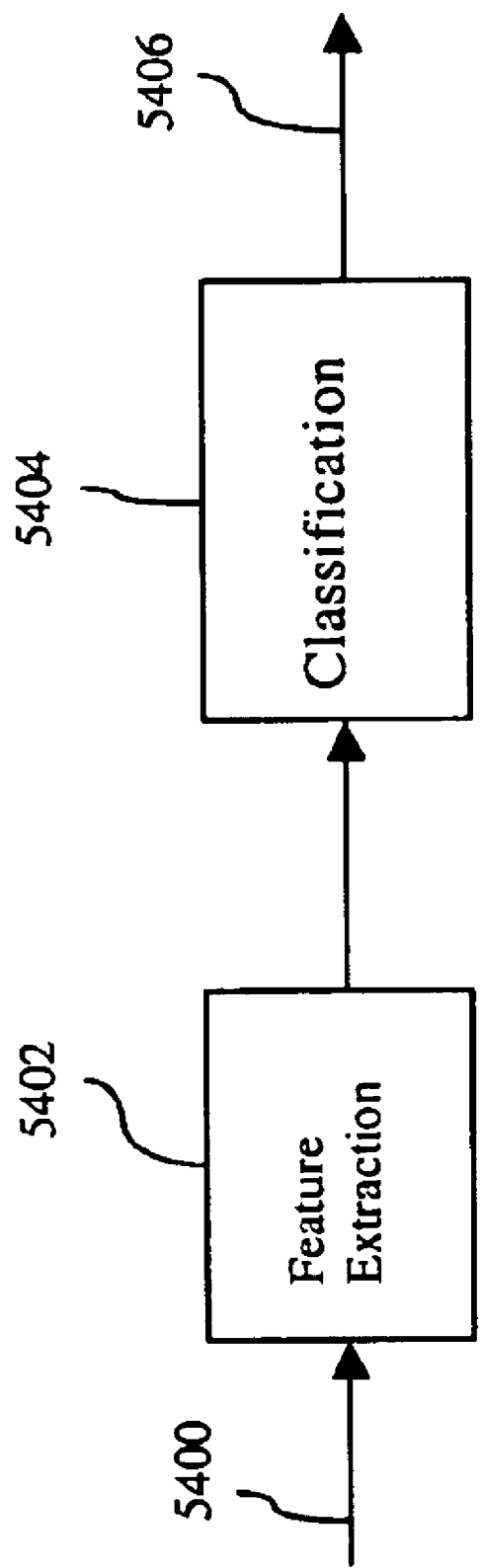
FIG. 9 shows the processing flow for the mark type classification module.

The process of mark type classification 5110 is shown in FIG. 9. In FIG. 9, the first step is feature extraction 5402 followed by the classification step 5404. Because the structures of different mark types are different, the extracted features may include the shape features that span the range of characteristics for the marks that are true possibilities such as the curvature of an arc, direction or intersection angles of lines, and the relations among geometric entities such as the relative position and/or the relative angle between lines and arcs. Other features can be derived from the projection of detected marks to the symmetry axes. Another such useful feature is projection of the filtered image inside the detected portion of the mark in the direction of processing by the elongated filters. The angle of the symmetric axes can also be a good feature. From these features, the classification step 5404 determines the type of the mark output 5406. The classification step can use parametric or non-parametric classifiers to classify the mark.

2.2 Estimate Fine Location Using Intelligent Measurement Method

Figure 8:
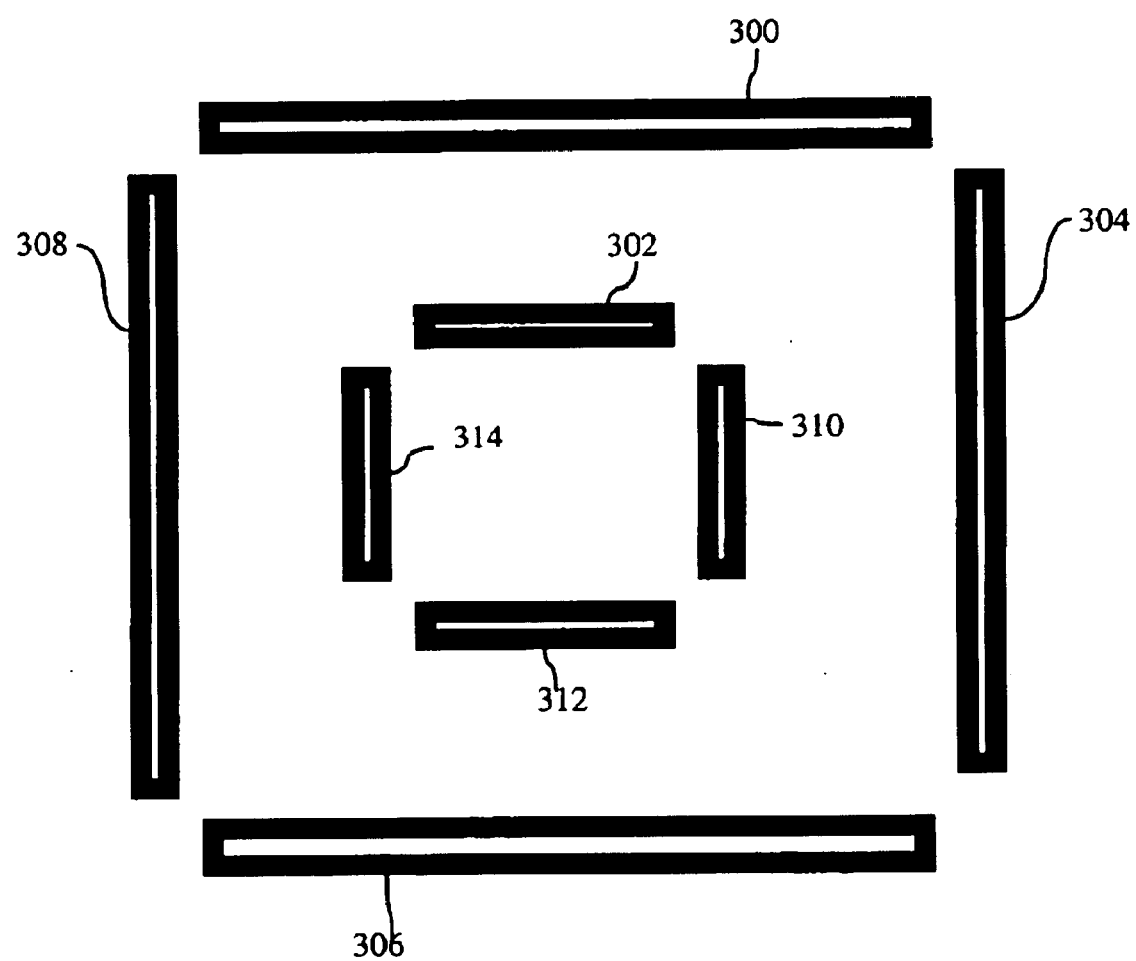
FIG. 8 shows an example registration mark.

To estimate finer location of the marks, a structure guided estimation method is used in this embodiment of the invention. In the preferred embodiment, the estimation is performed for inner and outer registration marks separately. The structure guided estimation method of this invention (Reference U.S. patent application Ser. No. 09/739,084 entitled, "Structure Guided Image Measurement Method", by Shih-Jong J. Lee et. al., filed Dec. 14, 2000 which is incorporated in its entirety herein) is used to estimate the position and orientation of the mark based upon all the detected portions of the mark. This can even be done when portions of the mark are not detected. The detected mark positions (in the respective binary image) mask the locations within the gray scale image that are used to estimate mark position. The position, scale, and orientation of the structure associated with the particular mark is the structure used in the structure-guided estimation method. A weight image may also be used to emphasize particularly important or definitive portions of the mark. The enhanced image output assembled from the outputs 5101, 5103 and 5105 could be used as the weight image if it is desired. The weight image can alternatively be artificially created by the designer. The structure-guided estimation method performs estimation from the weight image within the regions defined by each component of the measurement mask(s). The estimation is conducted by a weighted minimum-square-error (MSE) method. The estimation finds the parameters that minimize a cost function.

$$\text{Cost} = \sum_{m \in M} \sum_{i \in C_m} w_i [\text{Model\_Error}(x_i, y_i)]^2 - \text{Additional\_structure\_constraint}$$

Where M is the set of all components in the measurement masks and $C_m$ corresponds to the m-th component of the mask. Model_Error function represents the difference between the structure representation and the real data. The cost function is defined as the weighted square error between the structural mark model (symbolic representation) and all data points of all entities included in the estimation minus an additional structural constraint term. FIG. 8 shows an example mark that can be used to illustrate the use of constraints. The structure constraint for the outer mark in FIG. 8 includes two groups of parallel lines L 300, 306 and P 304, 308. (The inner mark 302, 310, 312, 314 is separately considered because the purpose in the FIG. 8 example is to measure the deviation from assumed position between the two marks. Thus each mark has to be considered separately.) The lines in L and the lines in P are perpendicular to each other as shown in FIG. 8. The cost function is $$\text{Cost} = \sum_{m \in L} \sum_{i \in L_m} w_i [a \ x_i + b \ y_i + c_m]^2 +$$

$$\sum_{n \in P} \sum_{i \in P_n} w_i [b \ x_i - a \ y_i + c_n]^2 - \lambda(a^2 + b^2 - 1)$$

A closed form solution exists for determining a, b, $c_m$ and $C_n$ that minimize Cost. When P is an empty set, only a parallel line constraint exists for a set of lines. This is a degenerate form of the structure constraint in this more general case.

When only one line each existed in groups L and P, the constraint becomes the existence of two orthogonal lines. This is a degenerate form of the structure constraint in this more general case. The entities are defined by each component of the measurement mask(s). The corresponding points in the measurement weight image weigh the data points during the estimation process. The result is very robust to noise and processing anomalies and achieves reliable sub-pixel accuracy.

2.3. Operation Size Determination by Learning

Even for a set of marks with structure constraints that are known a-priori, there are expected variations that can adversely affect performance either for robustness or for measurement accuracy. For best results, the constraints known for each mark type may need to be adjusted somewhat. Where allowance is made for adaptation, we can say that a learning improvement enhances the utility of the invention. Many such adaptations can be learned through a learning process according to the needs of the application. It should not be considered limiting of the scope of the invention that only a single example teaches the art. In the preferred embodiment, the width (size in the direction orthogonal to the elongated direction) of image of the registration mark is not the same for different product designs or manufacturing processing levels. Parameters of the operations are determined through a learning process that involves training for the particular application. If operation size is correctly learned, the registration mark can be more accurately detected because of improved noise removal and image enhancement 5102, thus avoiding a lot of artifacts.

The learning steps for each elongated direction are determined by the following rule:

(1) Set s=2, m[0]=0, i=1
(2) Calculate m[i]
(3) If m[i]<Threshold_Value AND m[i−1]>Threshold_Value, then go to (5) else go to (4)
(4) If s<Max_Size, then s=s+1, i=i+1 go to (2), else go to (5)
(5) Size=2*s+3

Figure 10:
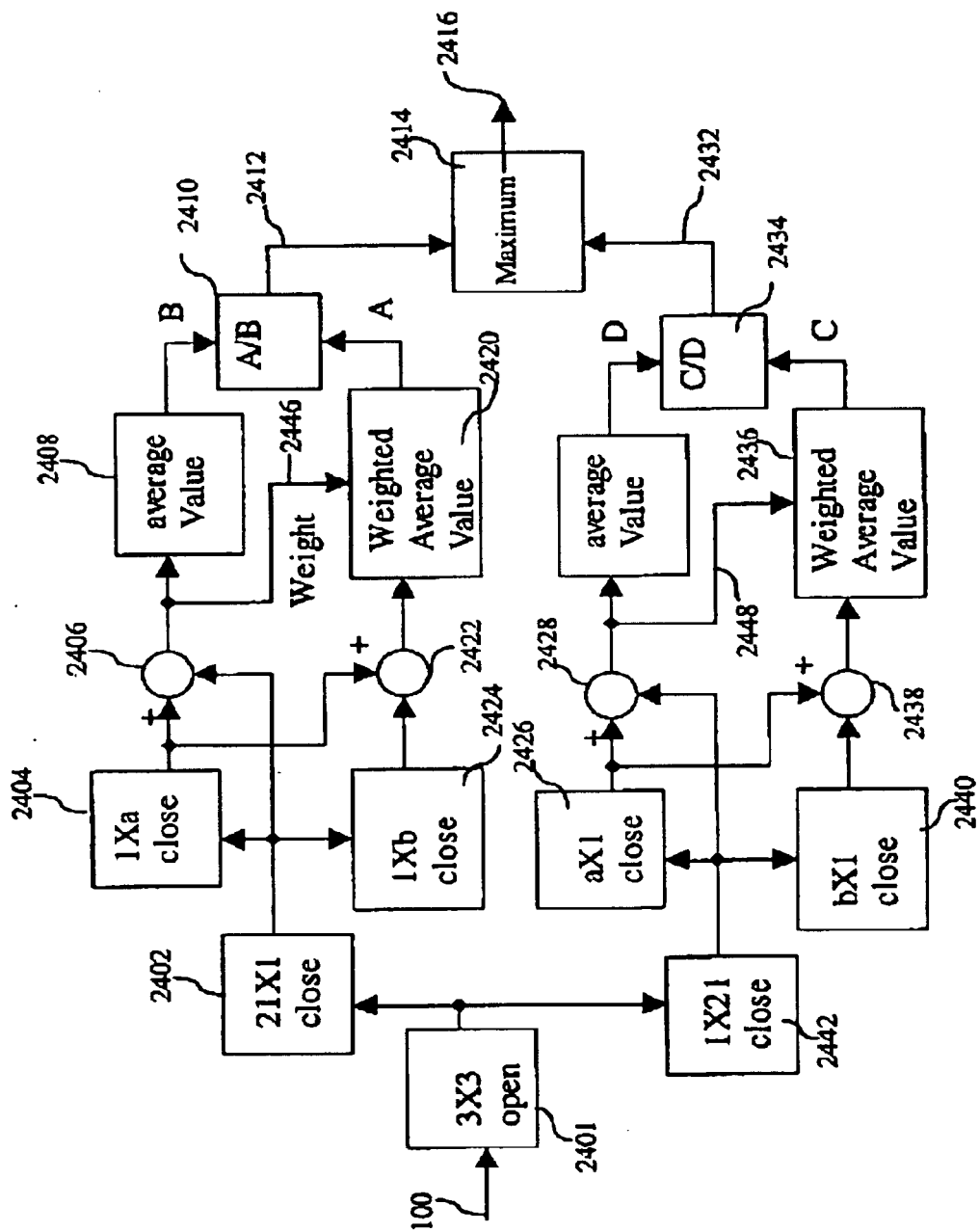
FIG. 10 shows a procedure to calculate m(i) where a=2*s+3 and b=2*s+1 and s is a learned indication of line width in the registration mark.
Figure 11:
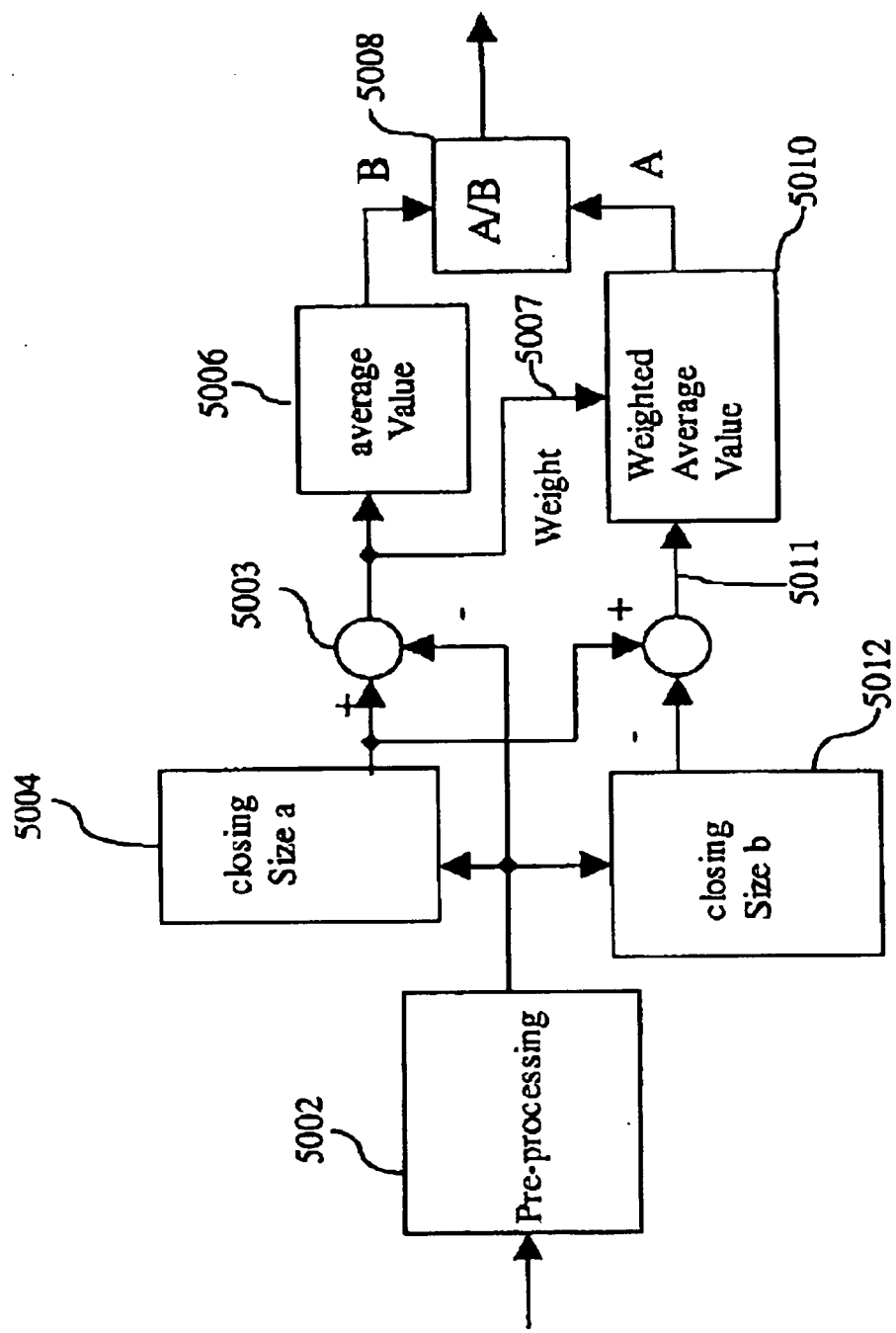
FIG. 11 shows the procedure for size learning.

In the above steps, m[i] is the accumulated difference between the results of two different operation size. A small m[i] means the resulting images are almost identical, the Size is the size of the last operation. Note that in this described embodiment, the expected width of mark lines is about 27 pixels. Setting the initial condition s=2 sets the minimum width of mark lines that can be learned. m[i] is calculated using the process shown in FIG. 10 and FIG. 11. In FIG. 11, the closing operation of size a 5004 and the closing operation of size b 5012 are operated in the orthogonal direction to the direction of the mark In this embodiment the process of learning mark line width is applicable to many different marks and the principles taught can be applied to features of the marks besides line width. The value Threshold$_{13}$ Value is set to 0.75 as a stop criterion. The Threshold_Value could be set to other values derived from training and selected by the designer. Max_Size is set to 13 based in this example on the maximum line width of about 27 pixels. Max_Size could be set to other values derived from training and selected by the designer. The m[i] is calculated using the process shown in FIG. 10. Note the explanatory relationship between FIG. 11 and FIG. 10. FIG. 11 explains the processes that are integrated together in FIG. 10. The processes 2401, 2402, and 2442 are pre-processing as described in 5002. The upper half of FIG. 10 is a process for horizontal line segments wherein for explanatory purposes 2404 corresponds with 5004, 2424 with 5012, 2406 with 5003, 2422 with 5011, 2408 with 5006, 2446 with 5007, 2420 with 5010, 2410 with 5008 and the bottom half of FIG. 10 is for vertical line segments wherein for explanatory purposes 2426 corresponds with 5004, 2440 with 5012, 2428 with 5003, 2438 with 5011, 2430 with 5006, 2448 with 5007, 2436 with 5010, 2434 with 5008. In this particular embodiment, a common part of the pre-processing operation is a 3X3 morphological opening to remove spike noise. The directional elongated processing includes a closing operation of 21X1 to pre-process the horizontal line segment and the 1X21 closing operation to pre-process the vertical line segment. Referring now to FIG. 11, we see that pre-processing filters the input learning image of the mark and prepares it for measurement leading eventually to a learned size. Following pre-processing, two different sized closing operations 5004 and 5012 are performed on the pre-processed learning image to compute a difference image between the two results 5011. This difference image is weighted using the closing residue image 5007 through a process of weighting that emphasizes the region of the gray scale image containing the essential information needed to draw conclusions about (in this case) the mark line width (either horizontal, as shown in the top half of FIG. 10 or the vertical as shown in the bottom half of FIG. 10).

In the preferred embodiment, the closing residue 5007 is used as a weight image for directed measurement of the difference image 5011. The weights allow gray level control of portions of the image according to the importance they represent to the estimation or measurement. This process is described in pending U.S. patent application Ser. No. 09/738,846 entitled, "Structure-guided Image Processing and Image Feature Enhancement" by Shih-Jong J. Lee, filed Dec. 15, 2000 which is incorporated in its entirety herein.

The weighted average operation 5010 computes a single value from the weighted difference image:

$$\text{Weighted Average}=\Sigma I[x][y]*Iw[x][y]/\Sigma Iw[x][y]$$

where

Iw[x][y] is the weight image 5007.
I[x][y] is the difference image 5011 between two closing operations performed on the pre-processed image.

The average of the closing residue image 5006 is also computed to normalize for image contrast variability. The normalization occurs through a ratio process 5008 to produce an intermediate result. The resulting m(i) 2416 of operation is the maximum 2414 of the intermediate result values of the operation for horizontal 2432 and vertical line segments 2412. Using m(i) the learning process iteration can be completed to converge on a learned line width.

2.4 Noise Filtering Using Learned Attribute

FIG. 5 shows the general approach to noise filtering using directional elongated filters to pre-process images. This general guidance is combined with the learned attribute in a particular embodiment. For this embodiment, FIG. 8 shows the mark type in the image that is pre-processed. In this mark, the lines are all identical width, the principal elements of the mark are oriented generally horizontal or vertical, and the overall mark outer dimensions are greater than 200 pixels. Images of the mark are used in a learning process to determine s, a parameter related to line width. Two pre-processing filters are created as shown in FIG. 12A for horizontal structures and FIG. 12B for vertical structures. The input image 100 is assumed to be dark lines. If this is not the case, the image is inverted before being applied to these filters. The initial closing with a directional elongated filtering element 402 cleans up off axis dark noise in the image. The closing residue of the filter 404 uses the learned attribute of line width to clean the mark elements and produces a bright image output. Another directional elongated structuring element is used 406 to fill in the gaps in the bright image of the mark elements followed by another elongated directional structure opening 408 to clean up residual bright noise (dark lines in the original image). The output 410 is a bright image of the lines in the mark that are aligned with the elongated structuring elements of the filter which in this example are horizontal. A complementary process is shown in FIG. 12B for the vertical portions of the mark. The initial closing with a directional elongated filtering element 412 cleans up off axis dark noise in the image. The closing residue of the filter 414 uses the learned attribute of line width to clean the mark elements and produces a bright image output. Another directional elongated structuring element is used 416 to fill in the gaps in the bright image of the mark elements followed by another elongated directional structure opening 418 to clean up residual bright noise (dark lines in the original image). The output 420 is a bright image of the lines in the mark that are aligned with the elongated structuring elements of the filter which in this example are vertical.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A method for detecting the mark in an image comprising:
   a. obtaining an image of at least one mark;
   b. locating the center of each mark based on symmetry;
   c. processing the mark image using at least one directional elongated filter;
   d. rejecting artifacts based on symmetry;
   e. classifying mark type wherein features for classification of mark type are selected from a group consisting of curvature of an arc, intersection angle of lines, relative position of lines, relative angle between lines, direction of symmetry axes, parallelism, projection of detected marks to the symmetry axes, and orthogonality of lines.

2. A method of locating a detected mark's position in an image comprising:
   a. creating a gray scale image of at least one mark;
   b. masking portions of the image based upon detected mark elements;
   c. estimating mark position using a structure guided estimation process wherein detected mark elements determine the constraints applied to the structure guided estimation process wherein the constraints are selected from a group consisting of parallel lines, perpendicular lines, rings, circles, arcs, line length, intersection angle of lines, and line width.

3. A method of measuring orientation of a mark in an image comprising:
   a. obtaining an image of at least one mark;
   b. locating the center of the each mark along each axis of symmetry;
   c. measuring the mark orientation using a structure-guided estimation process wherein detected mark determines the constraints applied to the structure guided estimation process wherein the constraints are selected from a group consisting of parallel lines, perpendicular lines, rings, circles, arcs, line length, intersection angle of lines, and line width.

* * * * *